Patented Oct. 30, 1951

2,573,422

UNITED STATES PATENT OFFICE 2,573,422

WAX COMPOSITION AND PREPARATION THEREOF

John J. Fish, New York, N. Y., assignor to Sun Chemical Corporation, New York, N. Y., a corporation of Delaware No Drawing. Application March 24, 1947, Serial No. 736,615

24 Claims. (Cl. 106—245)

This invention relates to wax materials obtained from hydrocarbon sources, and to processes for obtaining such wax materials.

One object of the present invention is to provide treated wax materials with superior characteristics in use as compared to hitherto available wax materials.

Another object of the present invention is to provide wax materials by subjecting hydrocarbons to successive chemical operations which result in the production of products with improved characteristics.

Another object of the present invention is to proxide wax materials from hydrocarbon sources by subjecting such hydrocarbons to successive chemical and physical operations to provide wax products which have superior characteristics as compared to hitherto available commercial waxes.

Another object of the present invention is to provide, from hydrocarbon sources, wax materials which are characterized by their ability to form stable emulsions in water of good leveling properties and which produce upon drying of such emulsions, films having an extremely high gloss.

Other objects of the invention will be apparent from the description and appended claims.

Waxes derived from hydrocarbons are available in extremely large quantities from many different sources of raw material. For example, the various oil fiields of the world yield crude oil materials all of which contain a substantial proportion of solid wax-like material. In order to utilize the petroleum for various purposes, as for example, in lubrication and to provide a source of fuel such as gasoline, it generally is necessary to remove the wax material from the oil. Thus, there is produced as a necessary by-product to production of oil and gasoline extremely large quantities of such waxy materials.

Many uses have been found for such waxes and within the limits of their physical characteristics, they have been utilized widely in many industries. However, for many purposes such wax materials are not satisfactory. For example, none of these materials as have hitherto been available have had satisfactory physical characteristics to permit their utilization in places where waxes such as montan, carnauba and like materials have been employed.

By practicing the present invention there are provided from such sources, wax materials which are superior in physical characteristics to the hitherto available waxes, and which can be utilized in places where waxes such as carnauba, montan, candellila and the like previously had been considered essential.

As one source of the wax materials of the present invention, there may be used any crude petroleum which has a sufficiently high proportion of waxy materials contained therein to afford a satisfactory volume of raw material. The type of crude oil chosen will depend mainly upon availability and price. In certain illustrative examples hereinafter set out there is used, as a source of wax-containing crude oil, a petroleum oil secured from the Oklahoma and east Texas fields in the United States.

In the removal of petroleum from the wells or reservoirs in which it is contained, the crude oil containing a mixture of sand, water and other impurities first is pumped into a so-called crude oil storage tank where it is allowed to stand or settle to permit separation of the sand, wax and water which separate with a relatively large proportion of wax and oil contained therein. When the settled petroleum is separated, there is withdrawn a liquid oily portion which is removed for further processing and separated into the various fractions and products commercially known. The residues which remain and which are generally classified as tank bottoms furnish one source of raw material for the products of the present invention.

Such tank bottoms obtained as described above may be treated to effect a separation of the sand, water and other non-hydrocarbon materials from the mixture. The separated hydrocarbon material ordinarily is fractionated to remove therefrom hydrocarbon liquids which are satisfactory as raw materials for the preparation of gasoline, lubricants and other well known petroleum products. Upon such distillation, using the crude oil hereinbefore described, a semi-solid hydrocarbon material is secured as a residue comprising ordinarily about 35 per cent by weight of wax material.

In practicing the present invention this residue from fractionation satisfactorily is treated under agitation conditions with sufficient sulfuric acid to effect precipitation of asphalts, asphaltenes and other materials which are removed by such acid treatment. Upon treatment and separation there is secured as a purified product a dark brown wax-like material which then may be neutralized with alkali or similar material to provide acid treated and neutralized tank bottoms.

The acid treated and neutralized tank bottoms then may be admixed with an agent which serves further to separate suspended impurities. For example, it has been found in the present invention that a fuller's earth material serves satisfactorily to effect separation of suspended and colored impurities. After such separation operation, the wax material is removed from the fuller's earth and subsequently distilled to separate as fractions the liquid hydrocarbon materials present, and as a residue, a dark amber wax material.

The wax material at such stage of operation generally contains a fairly high proportion of materials which are normally liquid at normal room temperatures. To effect separation of such material from the wax satisfactorily there is utilized a solvent extraction process, in which the wax-containing material is admixed with a solvent or mixture of solvents which is a good solvent for the liquid hydrocarbon materials present, but a relatively poor solvent for the wax materials. By such operations under proper manipulations as hereinafter described, the wax material present in such mixture may be effectively separated from the normally liquid hydrocarbons present and obtained as a separate product.

The wax which is secured as a result of such solvent operation, according to the present invention, subsequently is reacted with an oxygen-containing gas under conditions as hereinafter set out to effect change of the wax material and to provide a converted wax with the superior characteristics of the present invention.

The steps prior to the oxidation reaction as heretofore set out may be accomplished in different sequence, and where desirable, by other methods. For example, in place of solvent extraction, it might be desirable in some instances to effect separation of the wax material from liquid hydrocarbons contained therewith by methods such as distillation. Also, the previously described acid treatment may be varied, depending upon the crude oil which is utilized. The bleaching operations likewise may be effected with materials of the general characteristics of the fuller's earth material, or where unnecessary, may be eliminated. It has been found in the present invention that the sequential steps described in connection with the source materials employed lead to an extremely useful product. Also, in certain instances, it has been found according to the present invention that superior results are secured in practical operations by providing, prior to the oxidation sequence, a reaction step comprising treatment of the hydrocarbon material with a metallic halide, for example, aluminum chloride.

The following examples are given illustrative of successful commercial operations according to the present invention.

*Example 1*

Tank bottoms secured from crude oil as hereinbefore described and from which the sand, water and a portion of the liquid hydrocarbons present have been removed, are treated with sulfuric acid. Satisfactorily in commercial operations using tank bottoms secured from crude oil representative of the east Texas fields, 450 barrels of the separated tank bottoms are treated with 3,000 pounds of sulfuric acid under conditions such that precipitation of a major proportion of the asphalts and asphaltenes present is secured, such conditions including maintaining the mixture in a liquid condition as by heating, and under reactive agitation conditions as by stirring. In such operations the amount of asphalt and asphaltene material which separates as a sludge and is removed from the wax corresponds to about 20–25 per cent of the total tank bottoms charged for such refining. The sludge and sulfuric acid are removed from the wax material and the latter then treated with sufficient caustic to effect substantial neutralization of acid material present. Such neutralization can be effected by an operation similar to the acid treatment, that is, by maintaining the materials in liquid condition and under agitation. Subsequently the caustic is removed.

To bring about separation of suspended color materials remaining in the neutralized waxes, the latter is then mixed, using the quantities above described, with 11,000 pounds of fuller's earth, and agitated for a period of time sufficient to effect substantial removal of such colored bodies, after which the product is filtered to separate therefrom the fuller's earth. The bleached tank bottoms are then distilled up to a temperature of 550–600° F. at 28 inches pressure. During such distillation operations, a quantity of liquid hydrocarbon is separated, and there is secured as a residue an amber wax material.

The wax material obtained is charged to an extraction unit and admixed with a mixture of methyl ethyl ketone and benzol. Satisfactorily there may be utilized a mixture consisting of 70 per cent of the ketone and 30 per cent of benzol by weight. The ratio of wax to mixed solvent satisfactorily is maintained at 1:3. Initially, the mixture is warmed to a temperature slightly in excess of 200° F., for example 215–220° F. to secure complete solution of the materials present. Subsequently, the admixed materials are passed to a chilling unit and are chilled under agitation conditions. Upon such chilling operations, a wax material separates from the mixed solvent in the form of a substantially oil-free wax.

*Example 2*

Wax material obtained as described in Example 1 is placed in a reaction vessel, and the reaction vessel heated until the temperature of the wax is about 265° F. At this point approximately 0.5 per cent by weight of manganese stearate, based upon the weight of the wax material, is incorporated. An oxygen-containing gas then is introduced into the admixture which satisfactorily may be effected through a distributor device for such gas located at the bottom of the reaction vessel, the distributor device being connected to a compressor for furnishing the required amount of such gas. Normally, the passage through the wax admixture of the oxygen-containing gas effects sufficient agitation of the material such that no additional agitation is required. The rate of flow of the oxygen-containing gas, where air is used as such gas, satisfactorily is about 1.7 cubic feet per hour per pound of wax. Introduction of air is continued for a period of approximately one hour, during which time the temperature is increased to 280–285° F., which in practical operations may be accomplished by maintaining the reaction vessel in contact with a heating means such as a heated oil bath or steam bath. At the end of the period above set forth, approximately 0.5 per cent by weight of blown linseed oil, based upon the weight of wax material, is incorporated in the admixture. The flow of oxygen-containing gas is continued until the temperature of the reaction admixture approaches approximately 345° F. The temperature satisfactorily can be controlled by adjustment of the amount of air incorporated, an increased air flow tending to result in increase of temperature. The mixture is maintained at such temperature until the oxidation reaction is completed, as hereinafter described.

The product obtained as described in this example, has a penetration value below 10 and exhibits unusual characteristics of forming stable emulsions with water, which emulsions upon drying as films show extremely good leveling properties and high gloss.

In connection with the penetration value mentioned above and those hereinafter described in the specification, these values refer to penetration determined according to the A. S. T. M. method D–5–25, published by the American Society for Testing Materials. The conditions under which all penetration values were determined in the present specification was with a load of 100 grams for a period of 5 seconds at a temperature of 25° C., and the units of penetration indicate hundredths of a centimeter. These are the standard conditions set forth in the above designated A. S. T. M. method.

*Example 3*

One hundred pounds of wax material obtained as described in Example 1 are admixed with 3 pounds of aluminum chloride at a temperature of 200–215° F. under reactive agitation conditions as by stirring. The mixture is maintained at such reaction temperature for a time sufficient to effect the required reaction, which with the materials described above is about 7 hours. Upon the completion of such reaction, the aluminum chloride sludge is separated from the treated wax. Fuller's earth material then is added to the wax material and the temperature of the admixture raised to approximately 280° F., to facilitate precipitation of suspended materials. Subsequently the precipitated materials and fuller's earth are separated from the treated wax, satisfactorily by filtration.

The aluminum chloride treated wax then is brought to a temperature of about 265° F. and 0.5 per cent by weight of manganese stearate added. At this point introduction of an oxygen-containing gas, for example, air into the admixture is begun which may satisfactorily be effected through a distributor device, at the bottom of the wax container, which distributor is connected to a compressor for furnishing the required air. The oxygen-containing gas present effects sufficient agitation of the materials so that generally no additional agitation is required during this step. With the materials utilized above, about 1.7 cubic feet of air per hour per pound of wax is blown through the wax over a period of one hour, during which time the temperature of the reaction mixture is increased to 280–285° F., which may satisfactorily be accomplished by having the reaction vessel in contact with a heating means such as a heated oil bath or steam bath. At the end of one hour, one per cent by weight of blown linseed oil is added. Under such conditions, the flow of oxygen-containing gas is continued until the temperature of the batch approaches approximately 340° F. The temperature can be controlled by adjustment of the amount of oxygen-containing gas incorporated, a greater air flow tending to result in an increase of temperature. The mixture is maintained at a temperature of approximately 340° F. until the oxidation reaction is completed, which in the case of the materials above described, requires approximately 12–20 hours.

Products obtained according to the illustrative Examples 2 and 3 above set forth exhibit unusual properties of forming stable colloidal dispersions in water, which dispersions, or emulsions as they are commonly designated in the industry, upon drying as films exhibit good leveling properties and extremely high gloss ordinarily found only in films from materials such as carnauba wax.

The product obtained according to the illustrative Example 3 has a penetration value of approximately 8.

The foregoing illustrative examples described a method of procedure in which the source of hydrocarbon material comprises tank bottoms secured upon the settling of crude petroleum oils. In the practicing of the present invention other hydrocarbon materials also may be utilized, and products obtained which show the improved characteristics of the present invention. For example, satisfactory source materials include waxy materials separated from petroleum during the preparation of lubricating oil fractions, and other macrocrystalline waxes obtained in the refining of petroleum, and also mixtures consisting predominantly of hydrocarbons solid at normal room temperatures and resulting from the reaction of carbon monoxide and hydrogen according to the well known Fischer-Tropsch synthesis. The particular source of the hydrocarbon is not critical, it being desirable only that a material be employed which consists predominantly of hydrocarbons solid at normal room temperature.

In the specific illustrative example utilization of manganese stearate and blown linseed oil during the oxidation step have been described. Other material may be utilized in place of these, while still obtaining the desirable products of the present invention. For example, in place of manganese stearate, copper stearate, cobalt stearate, ferric stearate, aluminum stearate, aluminum linoleate, and other manganese or cobalt salts may be utilized. In place of the blown linseed oil any drying or semi-drying oil may be employed. In some instances it may be satisfactory to employ in place of both materials, a single compound. Thus, instead of the stearate and blown linseed oil or peroxide, there may be employed a compound such as methyl oleate or methyl linoleate.

Also, in the illustrative example particular reaction conditions were described satisfactory for use with the quantities of materials employed to secure adequately complete reaction of the type described. With other raw materials and different quantities, however, somewhat different reaction conditions will be necessary as is understood by those skilled in the art to which this invention relates. For example, in the step which comprises treatment with aluminum chloride where the quantity of raw material utilized is larger or smaller, or the quantity of aluminum chloride varied, the temperature and time conditions necessarily will be different than those set out in the illustrative example. One way of determining when the satisfactory reaction described has been secured is by removing a sample of the material from the reaction vessel and conducting a distillation thereon under highly reduced pressure conditions. The initial material of the illustrative example charged for aluminum chloride treatment does not distill at highly reduced pressure at temperatures below which substantial cracking of the materials occurs. However, it is found that as the aluminum chloride treatment progresses, the amount of material distillable at such reduced pressure without substantial cracking increases. Further, it has been found when the reaction is adequately completed according to the present invention that the material under treatment has reached a stage where approximately 40 per cent of it is distillable under such reduced pressure conditions without substantial cracking. This may be used as a guide in determining a satisfactory completion of this portion of the total operating procedure.

In the oxidation procedure above set forth, it has been found according to the present invention that there may advantageously be included in the reaction mixture during the oxidation sequence a small proportion of a metallic halide such as aluminum chloride.

Illustrative of successful commercial operations involving the use of such metallic halide during oxidation are the following examples:

*Example 4*

Wax material obtained as described in Example 1 is introduced into a reaction vessel, and the reaction vessel subsequently heated to bring the temperature of the wax material contained therein to approximately 265° F.; 0.5 per cent by weight of manganese stearate, based upon the weight of the wax, then is incorporated together with 0.1 per cent by weight of aluminum chloride, also based on the weight of the wax. Introduction of an oxygen-containing gas, such as air, then is begun, the air being introduced at the rate of approximately 1.7 cubic feet per hour per pound of wax. The introduction of air is continued for approximately one hour, while increasing the temperature of the wax to approximately 290° F. At the end of this time, 0.5 per cent by weight of blown linseed oil based upon the weight of wax material is incorporated, and introduction of air continued, while maintaining the temperature of the wax within the range of 290–300° F. until the oxidation reaction is completed, as hereinafter described. In this example, during the oxidation procedure following upon the addition of the blown drying oil, it is necessary to supply heat to the reaction mixture from the outside.

The product obtained has a penetration value of 3–4, and in some cases as low as 1. The product forms stable emulsions in water; the emulsions upon drying as films show extremely good leveling properties and high gloss.

*Example 5*

Wax material as obtained in Example 1 is admixed in a reaction vessel with aluminum chloride in the ratio of approximately three pounds of aluminum chloride to 100 pounds of wax. The temperature of the admixture is raised to 200–215° F. under reactive agitation conditions as by stirring. The mixture is maintained at such reaction conditions for a period of time sufficient to effect the required reaction which with the materials above described is about 7 hours. Upon the completion of such reaction, the aluminum chloride sludge is separated from the treated wax. Fuller's earth material then is added to the wax and the temperature of the mixture raised to approximately 280° F. to facilitate precipitation of suspended materials. Subsequently the precipitated materials and fuller's earth are separated from the treated wax, satisfactorily by filtration. The treated wax then is brought to a temperature of about 265°F., and 0.5 per cent by weight of manganese stearate, and 0.1 per cent by weight of aluminum chloride, both based upon the weight of the wax, are incorporated. At this point introduction of an oxygen-containing gas, for example, air, into the admixture is begun. Satisfactorily, the rate of air flow is about 1.7 cubic foot per hour per pound of wax, and a satisfactory temperature of the wax material during such introduction of air is approximately 280—285° F. Introduction of air is continued for approximately one hour, and there is then incorporated in the admixture 0.5 per cent by weight of blown linseed oil based upon the weight of wax material. Flow of air is continued, while maintaining the temperature of the reaction admixture at approximately 290–300° F. until the oxidation reaction is satisfactorily completed as hereinafter described.

The product obtained has a penetration value of approximately 5, or somewhat lower and exhibits desirable characteristics of forming stable emulsions in water, which emulsions upon drying as films exhibit extremely high gloss and leveling properties.

With such metallic halide incorporated, the reaction temperature satisfactorily may be maintained at an upper limit of 300° F., while at the same time securing products having an increased hardness and improved gloss, upon drying from films of an aqueous dispersion of such product, as compared to those products where oxidation is effected under comparable conditions, but without aluminum chloride present. Further, it has been found in the practicing of the present invention that the products secured where a metallic halide is present during the oxidation step, when formulated into an emulsion and subsequently flowed out, furnish a film of high gloss, which gloss is more stable than that secured with products which have been oxidized in the absence of the metallic halide, but otherwise under comparable conditions.

Also, when products are secured with the metallic halide present during oxidation, the resulting material, for example, may satisfactorily be diluted with a cheapening material, for example, unoxidized solid hydrocarbon without objectionably affecting the characteristics in use of the diluted material, such characteristics including gloss and leveling properties when prepared as an emulsion, and flowed out in films as described.

It is not known with certainty why such improved products are obtained utilizing the metallic halide, but one theory which may explain the characteristics of the products secured is as follows: during oxidation reaction, it may be assumed that two reactions predominantly are occurring, one resulting in the formation of acid material and alcohol material, and the other resulting in esters by interaction of the alcohols and acids secured. Normally, oxidation reactions are more rapid than esterification reactions, and it may be that in the absence of metallic halide that the oxidation reaction which results initially in the formation of acids and alcohols and finally in the predominant formation of acids proceeds more rapidly than the esterification reaction. With the metallic halide present on the other hand, it may be that the rate of the esterification reaction becomes more rapid as compared with the rate of reaction resulting in the formation of acid materials so that the proportion of esters to acids is therefore increased. Such esters may be controlling with reference to the gloss properties of the resulting product.

As is noted above, another advantage is obtained from the utilization of the metallic halide. This advantage lies in the fact that the reaction sequence can be effected at a substantially lower temperature than when the metallic halide is absent, thereby resulting in a more efficient and economical process.

Also there has been found according to the present invention, that a chlorinated hydrocarbon material such as chlorinated wax or a chlorinated product of a relatively high boiling liquid hydrocarbon may be utilized in the oxidation step in addition to, or in place of, the metallic halide such as aluminum chloride. Illustrative of commercial operations using such materials are the following examples.

Example 6

A wax material as obtained as directed in Example 1 is treated in the same manner as above described in Example 4, except that in place of the aluminum chloride, there is incorporated 0.7 per cent by weight, based upon the wax material, of chlorinated paraffin. The product obtained has a penetration value of 8 or lower and exhibits the desirable characteristics of forming stable emulsions in water, which upon drying as films have good leveling properties and high gloss.

Example 7

A wax material obtained as described in Example 1 is treated as described in Example 5, except that there is incorporated, together with the manganese stearate and aluminum chloride, approximately 0.3 per cent of chlorinated paraffin. The product obtained has a penetration value of 5 or less and exhibits the desirable emulsion and drying properties described in connection with the materials of the previous examples.

In the oxidation reaction, one satisfactory method of determining completion of this reaction according to the present invention consists in withdrawing samples of the wax material from the reaction vessel at intervals, and using such wax material to prepare a standard emulsion. When an emulsion is obtained which is stable, and which upon drying as a film shows good leveling properties and high gloss, the reaction step may be discontinued by shutting off the supply of oxygen-containing gas and allowing the mixture to cool. A satisfactory formula for such emulsion to determine when reaction is completed is as follows: Oxidized wax, 40 parts; stearic acid, 4 parts; morpholine, 3 parts; ammonia 26° Bé., 10 parts; and water, 236 parts. The wax and stearic acid are melted at 95° C. and the morpholine stirred in until a clear solution is secured. Small portions of the ammonia, diluted with 30 parts of hot water, are added slowly under stirring and in small portions, each new portion being added only after the previous one has been completely incorporated. The remaining water, at a temperature near its boiling point, is added slowly until the jelly-like emulsion which first forms becomes liquid, at which point the remainder of the water is added at once. Instead of stearic acid, oleic or other high molecular weight fatty acid may be employed. Instead of morpholine, other alkaline material such as triethanolamine may be utilized.

In some instances it is necessary to vary the above formula slightly to secure a satisfactory emulsion exhibiting the desirable leveling properties and gloss. Such formula is as follows: Oxidized wax, 40 parts; stearic acid, 8 parts; morpholine, 5 parts; water, 240 parts. This emulsion is prepared in the same manner as the emulsion previously described. In the case of the above oxidation reaction, it may be necessary to prepare both emulsions with samples withdrawn at intervals to determine when the reaction sequence is completed.

The above tests, while admittedly empirical, furnish a satisfactory indication of the end point of the reaction and for practical purposes in commercial operations are extremely satisfactory.

The wax products of the present invention prepared as above described have an acid number not less than approximately 12 and not more than approximately 30, a saponification number not greater than 85, and a ratio of saponification number to acid number of at least 2 to 1. In all cases the penetration values are less than 10.

The wax products of the present invention may satisfactorily be utilized in so-called non-rub floor polishes. One satisfactory polish is prepared containing the following ingredients: oxidized wax of the present invention, 7.5 parts; microcrystalline wax, 2.65 parts; stearic acid, 2.5 parts, triethanolamine, 1.7 parts; borax, 0.3 part; shellac, 2.0 parts; water, 83.35 parts. The proportions of the above ingredients may be varied somewhat, and the fatty acid and alkaline material may be replaced by analogous acids and alkaline substances. Also, the shellac may be replaced by other hard film forming resinous materials.

Such polishes, when poured in films upon surfaces such as linoleum, show extremely good leveling properties, and upon drying furnish extremely hard, glossy films without necessity for any buffing or polishing operation.

While the products herein described and processes of making the same constitute preferred embodiments of the invention, changes may be made therein without departing from the scope of the invention as defined in the appended claims.

What is claimed is:

1. A wax composition characterized by the property of forming stable emulsions in water, which emulsions upon drying form highly glossy films, consisting of the product obtained by subjecting a hydrocarbon wax material comprising predominantly hydrocarbons solid at normal room temperatures to treatment, at a temperature of at least 275° F., but below 400° F. with an oxygen-containing gas in the presence of an oxidation catalyst, approximately 0.3 to 0.7% by weight based upon the weight of said hydrocarbon wax material of chlorinated paraffin, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number not less than approximately 12 and not greater than approximately 30, a saponification number not greater than 85, a ratio of saponification number to acid number of at least 2 to 1, and a penetration value below 10.

2. A wax composition characterized by the property of forming stable emulsions in water, which emulsions upon drying form highly glossy films, consisting of the product obtained by subjecting a wax material obtained from a petroleum storage residue to treatment, at a temperature of at least 275° F., but below 400° F., with an oxygen-containing gas in the presence of an oxidation catalyst, approximately 0.3 to 0.7% by weight based upon the weight of said wax material of chlorinated paraffin, and approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number not less than approximately 12 and not greater than approximately 30, a saponification number not greater than 85, a ratio of saponification number to acid number of at least 2 to 1, and a penetration value below 10.

3. The process which comprises treatment, at a temperature of at least 275° F., but below 400° F., of a hydrocarbon wax material comprising predominantly hydrocarbons solid at normal room temperatures with an oxygen-containing gas in the presence of an oxidation catalyst, approximately 0.3 to 0.7% by weight based upon the weight of said hydrocarbon wax material of chlorinated paraffin, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material until a wax composition is obtained which is characterized by the property of forming stable emulsions in water, which emulsions upon drying, form highly glossy films, said wax composition having an acid number not less than approximately 12 and not greater than approximately 30, a saponification number not greater than 85, a ratio of saponification number to acid number of at least 2 to 1, and a penetration value below 10.

4. The process which comprises treatment, at a temperature of at least 275° F., but below 400° F., of a wax material obtained from a petroleum storage residue with an oxygen-containing gas in the presence of an oxidation catalyst, approximately 0.3 to 0.7% by weight based upon the weight of said wax material of chlorinated paraffin, and approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water, which emulsions upon drying, form highly glossy films, said wax composition having an acid number not less than approximately 12 and not greater than approximately 30, a saponification number not greater than 85, a ratio of saponification number to acid number of at least 2 to 1, and a penetration value below 10.

5. A wax composition characterized by the property of forming stable emulsions in water, which emulsions upon drying, form highly glossy films, consisting of the product obtained by subjecting a hydrocarbon wax material comprising predominantly hydrocarbons solid at normal room temperatures to the successive steps comprising treatment with approximately 3% by weight based upon the weight of said hydrocarbon wax material of aluminum chloride at temperatures in excess of 200° F., but below the temperatures at which substantial cracking of said hydrocarbon wax material occurs, for a period of at least 7 hours, and treatment, at a temperature of at least 275° F., but below 400° F., with an oxygen-containing gas, the latter step being conducted in the presence of an oxidation catalyst, approximately 0.3 to 0.7% by weight based upon the weight of said hydrocarbon wax material of chlorinated paraffin, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material, said wax composition having an acid number of not less than 12 and not greater than 30, a saponification number not greater than 85, a ratio of saponification number to acid number of at least 2 to 1, and a penetration value below 10.

6. A wax composition characterized by the property of forming stable emulsions in water, which emulsions upon drying, form highly glossy films, consisting of the product obtained by subjecting a wax material obtained from a petroleum storage residue to the successive steps comprising treatment with approximately 3% by weight based upon the weight of said wax material of aluminum chloride at temperatures in excess of 200° F., but below the temperature at which substantial cracking of said wax material occurs, for a period of at least 7 hours, and treatment, at a temperature of at least 275° F., but below 400° F., with an oxygen-containing gas, the latter step being conducted in the presence of an oxidation catalyst, approximately 0.3 to 0.7% by weight based upon the weight of said wax material of chlorinated paraffin, and approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number of not less than 12 and not greater than 30, a saponification number not greater than 85, a ratio of saponification number to acid number of at least 2 to 1, and a penetration value below 10.

7. The process which comprises the steps of treating a hydrocarbon wax material comprising predominantly hydrocarbons solid at normal room temperatures with approximately 3% by weight based upon the weight of said hydrocarbon wax material of aluminum chloride at temperatures in excess of 200° F., but below the temperature at which substantial cracking of said hydrocarbon wax material occurs, for a period of at least 7 hours, and thereafter treating the resulting reaction product with an oxygen-containing gas at a temperature of at least 275° F., but below 400° F., in the presence of an oxidation catalyst, approximately 0.3 to 0.7% by weight based upon the weight of said hydrocarbon wax material of chlorinated paraffin, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material until a wax composition is obtained which is characterized by the property of forming stable emulsions in water, which emulsions upon drying, form highly glossy films, said wax composition having an acid number not less than approximately 12 and not greater than approximately 30, a saponification number not greater than 85, a ratio of saponification number to acid number of at least 2 to 1, and a penetration value below 10.

8. The process which comprises the steps of treating a wax material obtained from a petroleum storage residue with approximately 3% by weight based upon the weight of said wax material of aluminum chloride at temperatures in excess of 200° F., but below the temperature at which substantial cracking of said wax material occurs, for a period of at least 7 hours, and thereafter treating the resulting reaction product at a temperature of at least 275° F., but below 400° F., with an oxygen-containing gas in the presence of an oxidation catalyst, approximately 0.3 to 0.7% by weight based upon the weight of said wax material of chlorinated paraffin, and approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the properties of forming stable emulsions in water which emulsions upon drying, form highly glossy films, said wax composition having an acid number of not less than approximately 12 and not greater than approximately 30, a saponification number not greater than 85, a ratio of saponification number to acid number of at least 2 to 1, and a penetration value below 10.

9. A wax composition characterized by the property of forming stable emulsions in water, which emulsions upon drying, form highly glossy films, consisting of the product obtained by subjecting a hydrocarbon wax material comprising predominantly hydrocarbons solid at normal room temperatures to treatment at a temperature of at least 275° F., but below 400° F., with an oxygen-containing gas in the presence of an oxidation catalyst and of approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material, said wax composition having an acid number not less than approximately 12 and not greater than approximately 30, a saponification number not greater than 85, a ratio of saponification number to acid number of at least 2 to 1 and a penetration value below 10.

10. A wax composition characterized by the property of forming stable emulsions in water, which emulsions upon drying, form highly glossy films, consisting of the product obtained by subjecting a wax material obtained from a petroleum storage residue to treatment at a temperature of at least 275° F., but below 400° F., with an oxygen-containing gas in the presence of an oxidation catalyst and of approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material said wax composition having an acid number not less than approximately 12 and not greater than approximately 30, a saponification number not greater than 85, a ratio of saponification number to acid number of at least 2 to 1, and a penetration value below 10.

11. The process which comprises treatment at a temperature of at least 275° F., but below 400° F., of a hydrocarbon wax material comprising predominantly hydrocarbons solid at normal room temperatures with an oxygen-containing gas in the presence of an oxidation catalyst and of approximately 0.5 to 1.0% by weight based upon the weight of said hydrocarbon wax material selected from the group consisting of drying oils, blown drying oils, semi-drying oils, blown semi-drying oils, and mixtures thereof, said oxygen containing gas being introduced at the rate of approximately 1.7 cu. ft. per hour per pound of said hydrocarbon wax material until a wax composition is obtained which is characterized by the property of forming stable emulsions in water, which emulsions upon drying form highly glossy films, said wax composition having an acid number not less than approximately 12 and not greater than approximately 30, a saponification number not greater than 85, a ratio of saponification number to acid number of at least 2 to 1, and a penetration value below 10.

12. The process which comprises treatment, at a temperature of at least 275° F., but below 400° F., of a wax material obtained from a petroleum storage residue with an oxygen-containing gas in the presence of an oxidation catalyst and of approximately 0.5 to 1.0% by weight based upon the weight of said wax material of a material selected from the group consisting of drying oils, blown drying oils, semi-drying oils, blow semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water, which emulsions upon drying form highly glossy films, said wax composition having an acid number not less than approximately 12 and not greater than approximately 30, a saponification number not greater than 85, a ratio of saponification number to acid number of at least 2 to 1, and a penetration value below 10.

13. A wax composition characterized by the property of forming stable emulsions in water, which emulsions upon drying, form highly glossy films, consisting of the product obtained by subjecting hydrocarbon wax material comprising predominantly hydrocarbons solid at normal room temperatures to the successive steps comprising treatment with approximately 3% by weight based upon the weight of said hydrocarbon wax material of aluminum chloride at a temperature in excess of 200° F., but below the temperature at which substantial cracking of said hydrocarbon wax material occurs, for a period of at least 7 hours, and treatment, at a temperature of at least 275° F., but below 400° F., with an oxygen-containing gas, the latter step being conducted in the presence of an oxidation catalyst and of approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material, said wax composition having an acid number of not less than 12 and not greater than 30, a saponification number of not greater than 85, a ratio of saponification number to acid number of at least 2 to 1, and a penetration value below 10.

14. A wax composition characterized by the property of forming stable emulsions in water, which emulsions upon drying, form highly glossy films, consisting of the product obtained by subjecting a wax material obtained from a petroleum storage residue to the successive steps comprising treatment with approximately 3% by weight based upon the weight of said wax material of aluminum chloride at a temperature in excess of 200° F., but below the temperatures at which substantial cracking of said wax material occurs, for a period of at least 7 hours, and treatment, at a temperature of at least 275° F., but below 400° F., with an oxygen-containing gas, the latter step being conducted in the presence of an oxidation catalyst and of approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number of not less than 12 and not greater than 30, a saponification number of not greater than 85, a ratio of saponification number to acid number of at least 2 to 1, and a penetration value below 10.

15. The process which comprises the steps of treating a hydrocarbon wax material comprising predominantly hydrocarbons solid at normal room temperatures with approximately 3% by weight based upon the weight of said hydrocarbon wax material of aluminum chloride at temperatures in excess of 200° F., but below the temperature at which substantial cracking of said hydrocarbon wax material occurs, for a period of at least 7 hours, and thereafter treating the resulting reaction product, at a temperature of at least 275° F., but below 400° F., with an oxygen-containing gas in the presence of an oxidation catalyst and of approximately 0.5 to 1.0% by weight based upon the weight of said hydrocarbon wax material of a material selected from the group consisting of drying oils, blown drying oils, semi-drying oils, blown semi-drying oils and mixtures thereof, said oxygen-containing gas being introduced at the rate of approximately 1.7 cu. ft. per hour per pound of said hydrocarbon wax material until a wax composition is obtained which is characterized by the property of forming stable emulsions in water, which emulsions upon drying form highly glossy films, said wax composition having an acid number not less than approximately 12 and not greater than approximately 30, a saponification number not greater than 85, a ratio of saponification number to acid number of at least 2 to 1, and a penetration value below 10.

16. The process which comprises the steps of treating a wax material obtained from a petroleum storage residue with approximately 3% by weight based upon the weight of said wax material of aluminum chloride at temperatures in excess of 200° F., but below the temperatures at which substantial cracking of said wax material occurs, for a period of at least 7 hours, and thereafter treating the resulting reaction product at a temperature of at least 275° F., but below 400° F., with an oxygen-containing gas in the presence of an oxidation catalyst and of approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water, which emulsions upon drying form highly glossy films, said wax composition having an acid number not less than approximately 12 and not greater than approximately 30, a saponification number not greater than 85, a ratio of saponification number to acid number of at least 2 to 1, and a penetration value below 10.

17. A wax composition characterized by the property of forming stable emulsions in water, which emulsions upon drying, form highly glossy films consisting of the product obtained by subjecting a hydrocarbon wax material comprising predominantly hydrocarbons solid at normal room temperatures to treatment, at a temperature of at least 275° F., but below 400° F., with an oxygen-containing gas in the presence of an oxidation catalyst, approximately 0.1% by weight based upon the weight of said hydrocarbon wax material of aluminum chloride, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material, said wax composition having an acid number not less than approximately 12 and not greater than approximately 30, a saponification number not greater than 85, a ratio of saponification number to acid number of at least 2 to 1, and a penetration value below 10.

18. A wax composition characterized by the property of forming stable emulsions in water, which emulsions upon drying, form highly glossy films, consisting of the product obtained by subjecting a wax material obtained from a petroleum storage residue to treatment, at a temperature of at least 275° F., but below 400° F., with an oxygen-containing gas in the presence of an oxidation catalyst, approximately 0.1% by weight based upon the weight of said wax material of aluminum chloride, and approximately 0.5 to 1.0% by weight based upon the weight of said wax material of a material selected from the group consisting of drying oils, blown drying oils, semi-drying oils, blown semi-drying oils and mixtures thereof, said oxygen-containing gas being introduced at the rate of approximately 1.7 cu. ft. per hour per pound of said wax material, said wax composition having an acid number not less than approximately 12 and not greater than approximately 30, a saponification number not greater than 85, a ratio of saponification number to acid number of at least 2 to 1, and a penetration value below 10.

19. The process which comprises treatment, at a temperature of at least 275° F., but below 400° F., of a hydrocarbon wax material comprising predominantly hydrocarbons solid at normal room temperatures with an oxygen-containing gas in the presence of an oxidation catalyst, approximately 0.1% by weight based upon the weight of said hydrocarbon wax material of aluminum chloride, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material until a wax composition is obtained which is characterized by the property of forming stable emulsions in water, which emulsions upon drying, form highly glossy films, said wax composition having an acid number not less than approximately 12 and not greater than approximately 30, a saponification number not greater than 85, a ratio of saponification number to acid number of at least 2 to 1, and a penetration value below 10.

20. The process which comprises treatment, at a temperature of at least 275° F., but below 400° F., of a wax material obtained from a petroleum storage residue with an oxygen-containing gas in the presence of an oxidation catalyst, approximately 0.1% by weight based upon the weight of said wax material of aluminum halide, and approximately 0.5 to 1.0% by weight based upon the weight of said wax material of a material selected from the group consisting of drying oils, blown drying oils, semi-drying oils, blown semi-drying oils, and mixture thereof, said oxygen-containing gas being introduced at the rate of approximately 1.7 cu. ft. per hour per pound of said wax material until a wax composition is obtained which is characterized by the property of forming stable emulsions in water, which emulsions upon drying, form highly glossy films, said wax composition having an acid number not less than approximately 12 and not greater than approximately 30, a saponification number not greater than 85, a ratio of saponification number to acid number of at least 2 to 1, and a penetration value below 10.

21. A wax composition characterized by the property of forming stable emulsions in water, which emulsions upon drying, form highly glossy films, consisting of the product obtained by subjecting hydrocarbon wax material comprising predominantly hydrocarbons solid at normal room temperatures to the successive steps comprising treatment with approximately 3% by weight based upon the weight of said hydrocarbon wax material of aluminum chloride at temperatures in excess of 200° F., but below the temperatures at which substantial cracking of said hydrocarbon material occurs, for a period of at least 7 hours, and treatment, at a temperature of at least 275° F., but below 400° F., with an oxygen-containing gas, the latter step being conducted in the presence of an oxidation catalyst, approximately 0.1% by weight based upon the weight of said hydrocarbon wax material of aluminum chloride, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material, said wax composition having an acid number of not less than 12 and not greater than 30, a saponification number of not greater than 85, a ratio of saponification number to acid number of at least 2 to 1, and a penetration value below 10.

22. A wax composition characterized by the property of forming stable emulsions in water, which emulsions upon drying, form highly glossy films, consisting of the product obtained by subjecting a wax material obtained from petroleum storage residue to the successive steps comprising treatment with approximately 3% by weight based upon the weight of said wax material of aluminum chloride at temperatures in excess of 200° F., but below the temperature at which substantial cracking of said wax material occurs, for a period of at least 7 hours, and treatment, at a temperature of at least 275° F., but below 400° F., with an oxygen-containing gas, the latter step being conducted in the presence of an oxidation catalyst, approximately 0.1% by weight based upon the weight of said wax material of aluminum chloride, and approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material, said wax composition having an acid number of not less than 12 and not greater than 30, a saponification number of not greater than 85, a ratio of saponification number to acid number of at least 2 to 1, and a penetration value below 10.

23. The process which comprises the steps of treating a hydrocarbon wax material comprising predominantly hydrocarbons solid at normal room temperatures with approximately 3% by weight based upon the weight of said hydrocarbon wax material of aluminum chloride at temperatures in excess of 200° F., but below the temperatures at which substantial cracking of said hydrocarbon wax material occurs, for a period of at least 7 hours, and thereafter treating the resulting reaction product with an oxygen-containing gas at a temperature of at least 275° F., but below 400° F., in the presence of an oxidation catalyst, approximately 0.1% by weight based upon the weight of said hydrocarbon wax material of aluminum chloride, and approximately 0.5 to 1.0% by weight based upon the weight of said hydrocarbon wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said hydrocarbon wax material until a wax composition is obtained which is characterized by the property of forming stable emulsions in water which emulsions upon drying form highly glossy films, said wax composition having an acid number not less than approximately 12 and not greater than approximately 30, a saponification number not greater than 85, a ratio of saponification number to acid number of at least 2 to 1, and a penetration value below 10.

24. The process which comprises the steps of treating a wax material obtained from a petroleum storage residue with approximately 3% by weight based upon the weight of said wax material of aluminum chloride at temperatures in excess of 200° F., but below the temperature at which substantial cracking of said wax material occurs, for a period of at least 7 hours, and thereafter treating the resulting reaction product at a temperature of at least 275° F., but below 400° F., with an oxygen-containing gas in the presence of an oxidation catalyst, approximately 0.1% by weight based upon the weight of said wax material of aluminum chloride, and approximately 0.5 to 1.0% by weight based upon the weight of said wax material of a material selected from the group consisting of drying oils, blown drying oils, semi-drying oils, blown semi-drying oils, and mixtures thereof, said oxygen-containing gas being introduced at the rate of approximately 1.7 cu. ft. per hour per pound of said wax material until a wax composition is obtained which is characterized by the property of forming stable emulsions in water which emulsions upon drying form highly glossy films, said wax composition having an acid number not less than approximately 12 and not greater than approximately 30, a saponification number not greater than 85, a ratio of saponification number to acid number of at least 2 to 1, and a penetration value below 10.

JOHN J. FISH.

REFERENCES CITED

The following references are of record in the file of this patent:

UNITED STATES PATENTS

| Number | Name | Date |
|---|---|---|
| 1,780,632 | Pungs | Nov. 4, 1930 |
| 2,299,306 | Cornell | Oct. 20, 1942 |
| 2,349,326 | Wilson | May 23, 1944 |
| 2,391,236 | Hirsch | Dec. 18, 1945 |
| 2,424,671 | Stossel | July 29, 1947 |